United States Patent
Ledbetter

(10) Patent No.: US 11,457,623 B2
(45) Date of Patent: Oct. 4, 2022

(54) RODENT TRAP HAVING A PIVOTING HAMMER

(71) Applicant: William M. Ledbetter, Terrebonne, OR (US)

(72) Inventor: William M. Ledbetter, Terrebonne, OR (US)

( * ) Notice: Subject to any disclaimer, the term of this patent is extended or adjusted under 35 U.S.C. 154(b) by 232 days.

(21) Appl. No.: 16/866,937

(22) Filed: May 5, 2020

(65) Prior Publication Data

US 2021/0345596 A1   Nov. 11, 2021

(51) Int. Cl.
  *A01M 23/30*   (2006.01)
(52) U.S. Cl.
  CPC ......... *A01M 23/30* (2013.01); *A01M 2200/00* (2013.01)
(58) Field of Classification Search
  CPC .. A01M 23/30; A01M 23/24; A01M 2200/00; A01M 23/00
  USPC ............................................................ 43/81
  See application file for complete search history.

(56) References Cited

U.S. PATENT DOCUMENTS

| | | | | |
|---|---|---|---|---|
| 1,347,310 A | * | 7/1920 | Van Meter | A01M 23/24 43/81 |
| 2,060,947 A | * | 11/1936 | Morrow | A01M 23/36 43/77 |
| 2,459,580 A | * | 1/1949 | Oleen | A01M 23/00 56/341 |
| 3,204,365 A | * | 9/1965 | Sartin | A01M 23/30 43/81 |
| 4,288,940 A | * | 9/1981 | Ensey | A01M 23/00 43/58 |
| 4,494,335 A | * | 1/1985 | Gaines | A01M 23/30 43/80 |
| 6,508,031 B1 | * | 1/2003 | Johnson | A01M 23/30 43/88 |
| 10,757,931 B1 | * | 9/2020 | Hahn | A01M 99/00 |

FOREIGN PATENT DOCUMENTS

CN    108377827 A  *  8/2018  ............. A01G 13/10

* cited by examiner

*Primary Examiner* — Peter M Poon
*Assistant Examiner* — Carly W. Lynch
(74) *Attorney, Agent, or Firm* — Jose R Mata

(57) ABSTRACT

A rodent kill trap in some embodiments includes at least a handle, first and second legs that are at least one of fixedly coupled with or integral with the handle, first and second parallel crossmembers coupled with and extending between the first and second legs, a trigger rotatably coupled with the first crossmember, the trigger including at least a length of the trigger extending away from the first crossmember, a hammer rotatably coupled with the second crossmember, and a sear as part of the trigger configured for being braced against the hammer in a cocked position in which the hammer is rotated about the second crossmember in opposition to a bias mechanism and wherein if the length of the trigger member is engaged by a rodent the sear is configured to be dislodged from the hammer thereby releasing the hammer to rotate in an arc to strike the rodent.

20 Claims, 10 Drawing Sheets

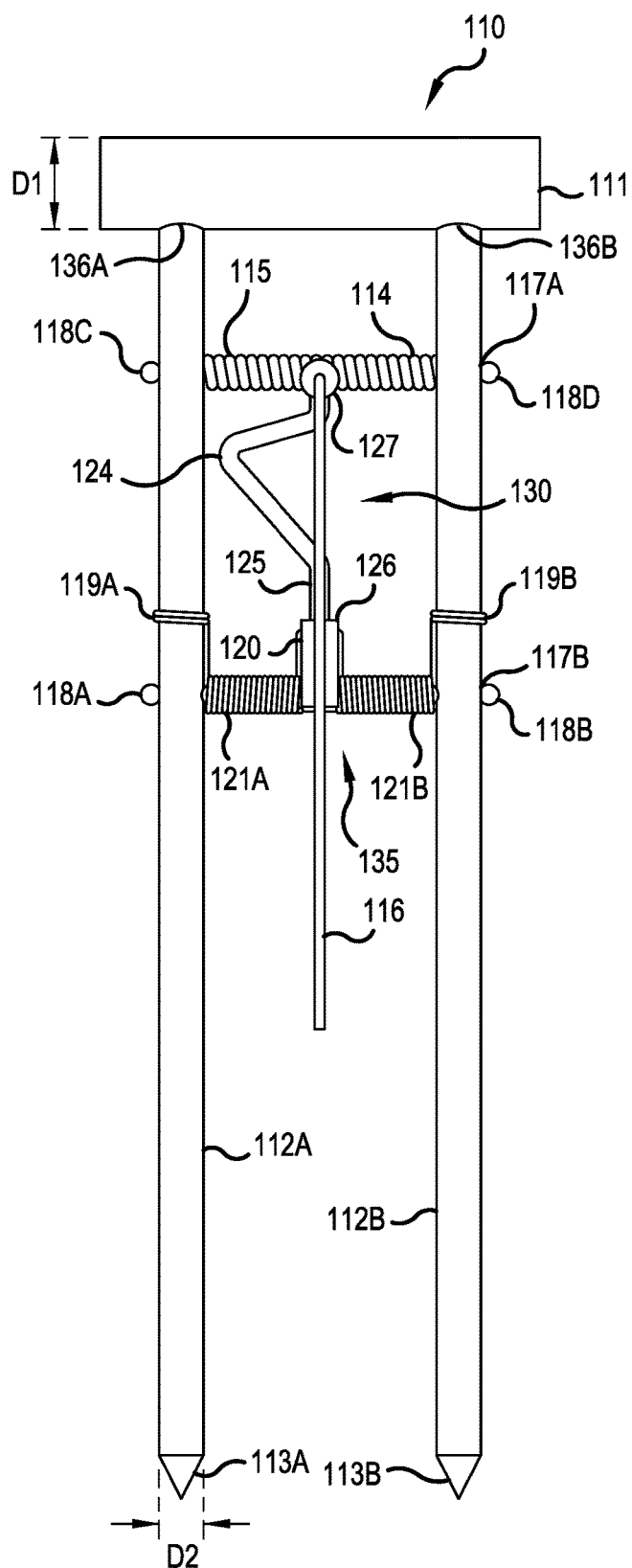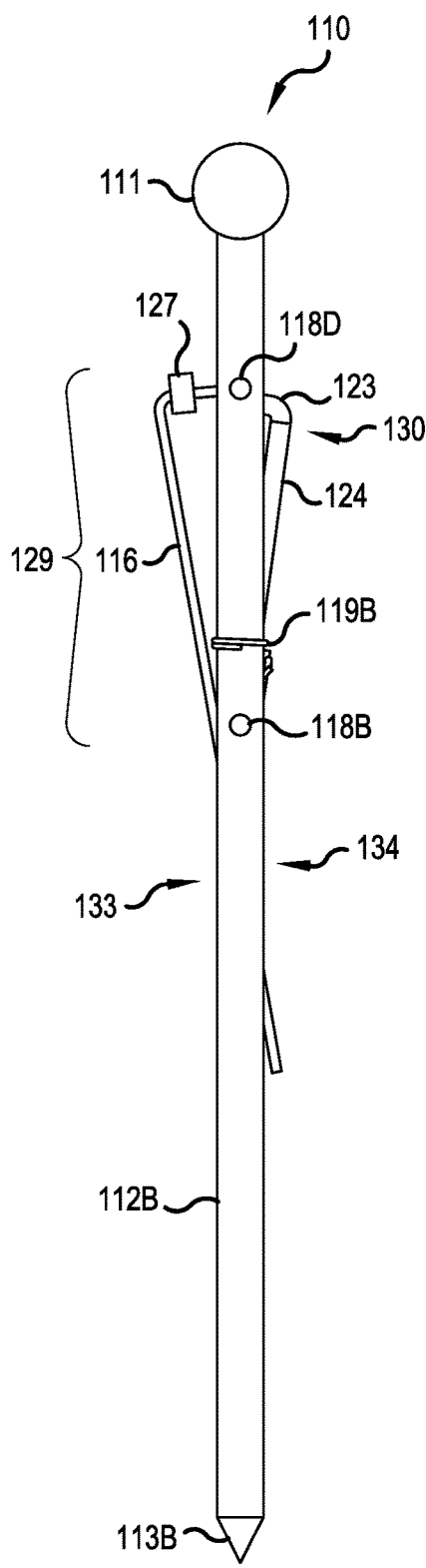
FIG. 1A
FIG. 1B

RODENT TRAP HAVING A PIVOTING HAMMER

TECHNICAL FIELD

Embodiments relate to a rodent killing trap. Particular embodiments related to a rodent killing trap with a pivoting hammer.

BACKGROUND

There are a variety of traditional types of animal traps. However, they have a variety of disadvantages when it comes to trapping or killing rodents such as voles, ground squirrels, gophers, marmots, mice, rats, and other rodents. For example snap traps catch mice but are often ineffective against voles. Many farmers poison rodents such as ground squirrels, but poisons cause environmental harm. Some individuals attempt to kill or drive away rodents by pouring diesel oil and similar liquids down rodent holes. Others attempt to gas rodents with gases such as propane gas. However, both diesel oil and propane gas can be dangerous and costly and often are not effective. Other available animal traps are complicated and hard to figure out how to use. Some complicated devices even have Wi-Fi.

Thus, there is a need for a device that is simple and safe to operate, inexpensive to make, and which works well on targeted animals.

SUMMARY

The following summary introduces at a high level a limited number of topics described in the Detailed Description. This summary is not intended to identify key or essential features and should not be used for that purpose. In addition, this summary is not intended to be used as a guide to the scope of the claims. Instead, this Summary is provided as an introduction for the reader.

In some embodiments a rodent kill trap includes at least a handle and at least first and second legs that are at least one of fixedly coupled with or integral with the handle and that are configured to be positioned via the handle.

The rodent kill trap further includes at least first and second parallel crossmembers coupled with and extending between the first and second legs, the first crossmember being closer to the handle than the second crossmember.

The rodent kill trap further includes at least a trigger rotatably coupled with the first crossmember, the trigger including at least a length of the trigger extending away from the first crossmember.

The rodent kill trap further includes at least a hammer rotatably coupled with the second crossmember and in engaging contact with a bias mechanism that resists rotation of the hammer about the second crossmember.

And the rodent kill trap further includes at least a sear as part of the trigger configured for being braced against the hammer in a cocked position in which the hammer is rotated about the second crossmember in opposition to the bias mechanism and wherein if the length of the trigger member is engaged by a rodent the sear is configured to be dislodged from the hammer thereby releasing the hammer to rotate in an arc to strike the rodent.

BRIEF DESCRIPTION OF THE FIGURES

Various embodiments are described below with reference to drawings which are now summarized. It should be noted that these drawings are not necessarily to scale. In addition, the drawings are simplified to avoid obscuring important principles with unnecessary details.

FIG. 1A is a front view of a trap, consistent with some embodiments.

FIG. 1B is a right side view of the trap of FIG. 1A. In this view the trap is shown in a safe configuration.

DETAILED DESCRIPTION

Some embodiments are now described with reference to the above-described figures. In the following description, multiple references are often made to "some embodiments." These references to "some embodiments" are not necessarily referring to the same embodiments, as numerous and varied embodiments are possible. No effort is made to describe all possible embodiments. Sufficient embodiments are described so that those skilled in the art will become appraised of the relevant principles. In addition, disclosed embodiments are not necessarily preferred or advantageous over other embodiments.

Numerous references are made to "high strength wire." As used herein, the term high strength wire includes at least music wire (e.g., piano wire) or other wire made from tempered high-carbon steel, also known as spring steel. This high strength wire has a high tensile strength and is used in applications herein because of its ability to resist the torque force of a swinging hammer without bending.

Some embodiments provide a rodent trap with a pivoting hammer that is configured, when released from a cocked position by an animal making contact with a trigger, to swing in an arc and strike and kill the rodent. The trap is intended to kill rodents ranging in size from voles to marmots, including at least rats, moles, gophers, rabbits and most other rodents that live in dens, follow trails or invade homes. The trap itself can be made in many sizes and shapes. With a variety of different size, shape, and configuration options for this trap, the preferred size and shape of a trap used is best determined by the species and size of animal being trapped. It may be that the size of trap be numbered from say 0 thru 5 where the size of trap corresponds to the size of animal to be trapped.

Figure 4:
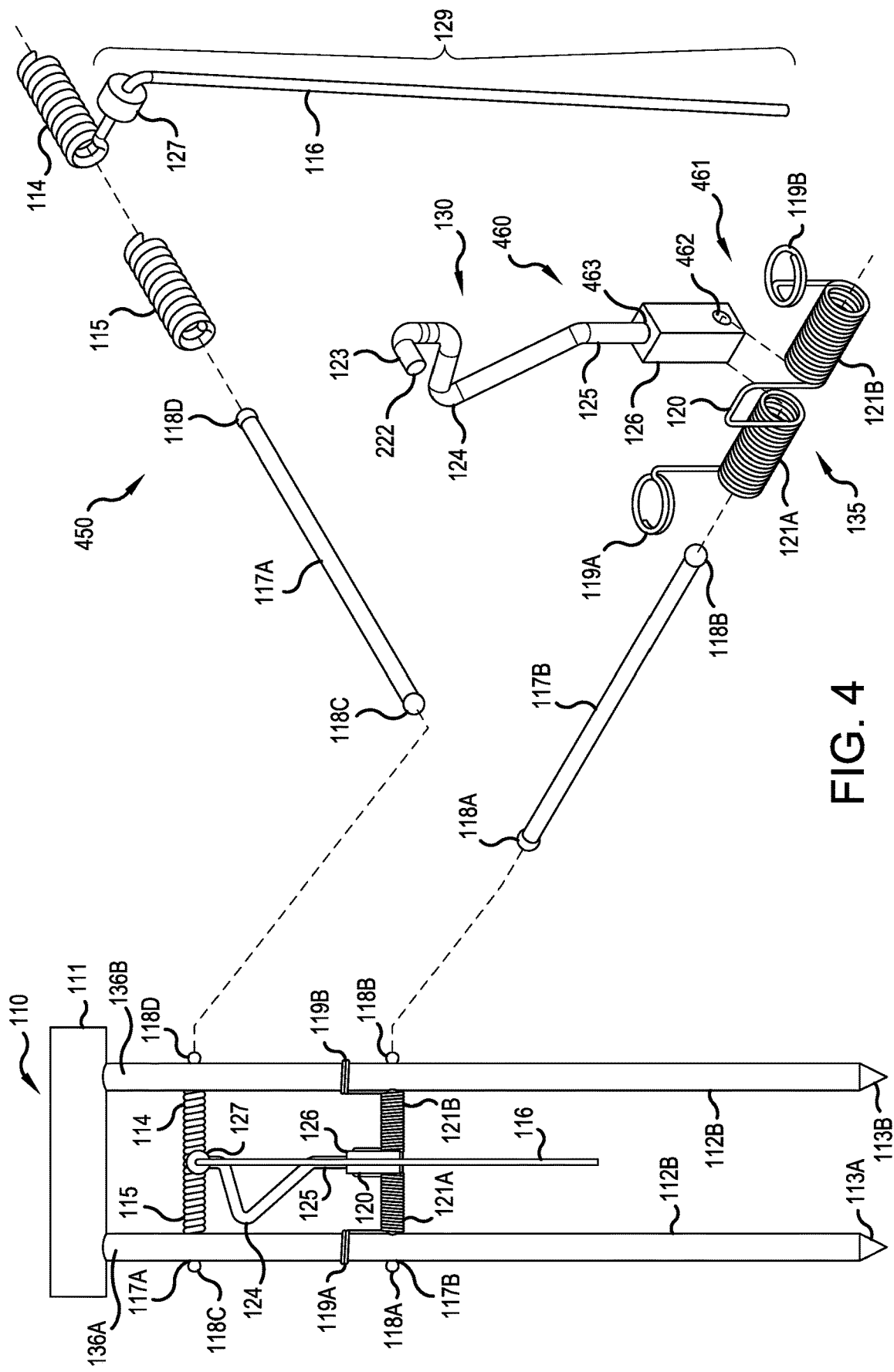
FIG. 4 is a frontal view of the trap of FIG. 1A, showing both an exploded view of the trigger assembly and an exploded view of the hammer assembly.

An embodiment of a trap 110 for outdoor use is now described with reference to FIGS. 1A-2B, and 4. This embodiment features longer legs than some other embodiments, the legs 112A, 112B having points 113A, 113B for penetrating ground when pushed into the ground by a handle 111. The primary functioning parts of trap 110 are a trigger assembly 450 as shown in FIG. 4 and a hammer assembly 460 as shown in FIG. 4.

Referencing FIGS. 1A-2B and 4, trap 110 includes at least a handle 111, which could be made of steel and at least one of coupled with or integral with two legs 112A, 112B (although shown as long circular shape, they may be square or other shapes). In some embodiments the handle 111 and legs 112A, 112B are made of steel. Handle 111 may be coupled with or integral with legs 112A, 112B at one or more ends 136A, 136B of legs 112A, 112B. In some embodiments the legs 112A, 112B have a smaller diameter than the handle 111. For example, in some embodiments a diameter (i.e., D1 of FIG. 1A) of handle 111 is at least twice that of diameters (i.e. D2 of FIG. 1A) for legs 112A, 112B (e.g., if handle 111 has a diameter of ⅝ inches and legs 112A, 112B have diameters of 5/16 inches). In this first embodiment shown the legs 112A, 112B are attached to the handle 111 by either being press fit into holes predrilled into the handle 111. In other embodiments the legs 112A, 112B may be made integral with handle 111 (e.g. by welding, injection molding, etc.).

Having a handle 111 with a larger diameter than the legs 112A, 112B and generally making the handle 111 large and heavy (relative to legs 112A, 112B and relative to trap 110 as a whole) has benefits. First, it makes a better handle for grasping when setting and cocking the trap 110 than a smaller handle would which makes it safer to use. Second, when the trap 110 is tripped and the hammer 130 swings, the swinging hammer 130 has weight and centrifugal force and a heavier trap 110 (i.e. based on heavier handle) can more readily resist this centrifugal force. If this centrifugal force causes the handle 111 and trap 110 to move, the hammer 130 may strike with reduced force that may not be lethal force. Having a heavier handle 111 (e.g., one with a larger diameter than legs 112A, 112B) provides a trap 110 that is more lethal. Nevertheless, in some embodiments handle 111 does not have a larger diameter than legs 112A, 112B.

Continuing with reference to FIGS. 1A-2B and 4, trap 110 may include an upper crossmember 117A and a lower crossmember 117B (i.e., upper or lower relative to the ground the legs 112A, 112B are inserted into or relative to a floor a base of a trap (see discussion below relative to FIGS. 3A-3B) is standing on). In the embodiment shown, crossmembers 117A, 117B are mounted through holes (not shown) in the legs 112A, 112B. In some embodiments, crossmembers 117A, 117B, are made from high strength wire (e.g., made from tempered high-carbon steel) and held in place by heating their ends to the point where the crossmembers 117A, 117B expand forming balls 118A, 118B, 118C, 118D larger than diameters of holes through which the crossmembers 117A, 117B were inserted. Thus the crossmembers 117A, 117B are maintained in place between the legs 112A, 112B. This method of installation allows the crossmembers 117A, 117B to rotate freely between the legs 112A, 112B without binding as well as allowing more flexibility of the legs 112A, 112B when driven into the ground than welding or press fitting the crossmembers 117A, 117B in-place would allow.

Referencing FIG. 1B, trap 110 is shown in a safe configuration in which hammer face 222 is stationed behind legs 112A, 112B pressing against the back of the trigger coil 114 and spacer 115, supported by the upper crossmember 117A.

Referencing FIG. 4, a trigger assembly 450 is mounted on the upper crossmember 117A. Trigger assembly 450 includes at least a trigger spacer 115, trigger coil 114, and trigger 129 which includes at least sear 127 and trigger-wire 116. Depending on the embodiment, sear 127 may be integral with (e.g., welded to) or coupled with (e.g., fastened or bolted) trigger-wire 116.

Trigger coil 114 (in this particular embodiment) is made of high strength wire that is coiled multiple times around one side of the crossmember 117A creating a hinge point for the trigger-wire 116 to rotate on. This trigger coil 114 also serves as a spacer to keep the trigger-wire 116 centered about crossmember 117A between the legs 112A, 112B. After the trigger coil 114, that same high strength wire of which trigger coil 114 is made continues on to extend out from the trigger coil 114 through the sear 127 then make a sharp bend downward forming the trigger-wire 116. The sear 127 may (in some embodiments) be made from brass and mounted on the trigger-wire 116 so that hammer face 222 may be placed in a cocked position in which hammer face 222 is pressed (e.g. braced) against sear 127. Then as the trigger-wire 116 is moved (e.g, by rodent engaging trigger-wire 116) the sear 127 slides up the hammer face 222 to the point of release. Brass is preferred for the sear 127 because steel would rust and cause added friction between the hammer 130 and sear 127. Yet in some embodiments materials other than brass are used for sear 127 (e.g., stainless steel). Across from the trigger coil 114 the crossmember 117A has another section of coiled wire which serves as trigger spacer 115. The function of this spacer 115 is to work in conjunction with the trigger coil 114 to keep the trigger-wire 116 centered about crossmember 117A.

Again referencing FIG. 4, a hammer assembly 460 is mounted on lower crossmember 117B. Hammer assembly 460 includes at least bias mechanism 461 (which in this depicted embodiment is in the form of double torsion spring 135, with springs 121A, 121B, anchors 119A, 119B, and center piece 120) and hammer 130 (which includes hammer face 222, hammer head 123, cocking lever 124, hammer shaft 125, and hammer base 126). In some embodiments hammer base 126 is made of steel stock. In some embodiments hammer base 126 may be formed by forming (e.g., drilling) a first hole 463 in the base for insertion of high strength wire (for forming hammer shaft 125 and other structures discussed below) and forming (e.g. drilling) a second hole 462 orthogonal to the first for mating with crossmember 117B before balls 118A and 118B are formed at ends of crossmember 117B. The hammer base 126 may then be mounted on the crossmember 117B through its second hole. The high strength wire forming hammer shaft 125 is mounted firmly in place in the first hole. After forming the hammer shaft 125 the music-wire makes one or more bends (e.g., to form a corner, an arc, or other shape for gripping) to form cocking lever 124. The cocking lever is shaped to be gripped by the fingers of a user when cocking the hammer 130. Then high strength wire bends back from the one or more bends to form a length of high strength wire inline with hammer shaft 125, it makes a further bend to form the hammer head 123 with hammer face 222 at the end of the high strength wire. This hammer 130 is spring loaded and rotates around the lower crossmember 117B while a double torsion spring 135, constructed from high strength wire, is configured, for example as described below, to keep the hammer assembly 460 centered on the crossmember 117B.

In the embodiment of FIGS. 1A-2B and 4, the double torsion spring 135 is mounted on the lower crossmember 117B with spring 121A and spring 121B on either side of the hammer base 126. The springs 121A and spring 121B are anchored respectively to the legs 112A, 112B by means of a coils 119A, 119B formed respectively in the ends of the springs 121A, 121B and slid over the legs 112A, 112B during assembly. The hammer base 126 is inserted into double torsion spring 135 at the center section. With the hammer base 126 inserted, the center section 120 of the double torsion spring 135 press against the hammer base 126 to cause a significant amount of force (i.e. spring tension) to be built up when the hammer 130 is rotated in opposition to the double torsion spring 135 to be placed in a cocked position against the sear 127 of trigger 129. This built up force is transferred to the hammer head 123 so when it is released by the sear 127 it rotates in an arc with lethal force around the crossmember 117B. That is, the hammer head 123 pivots around the crossmember 117B so fast that when it strikes an animal it has the power to kill it.

Figure 2A:
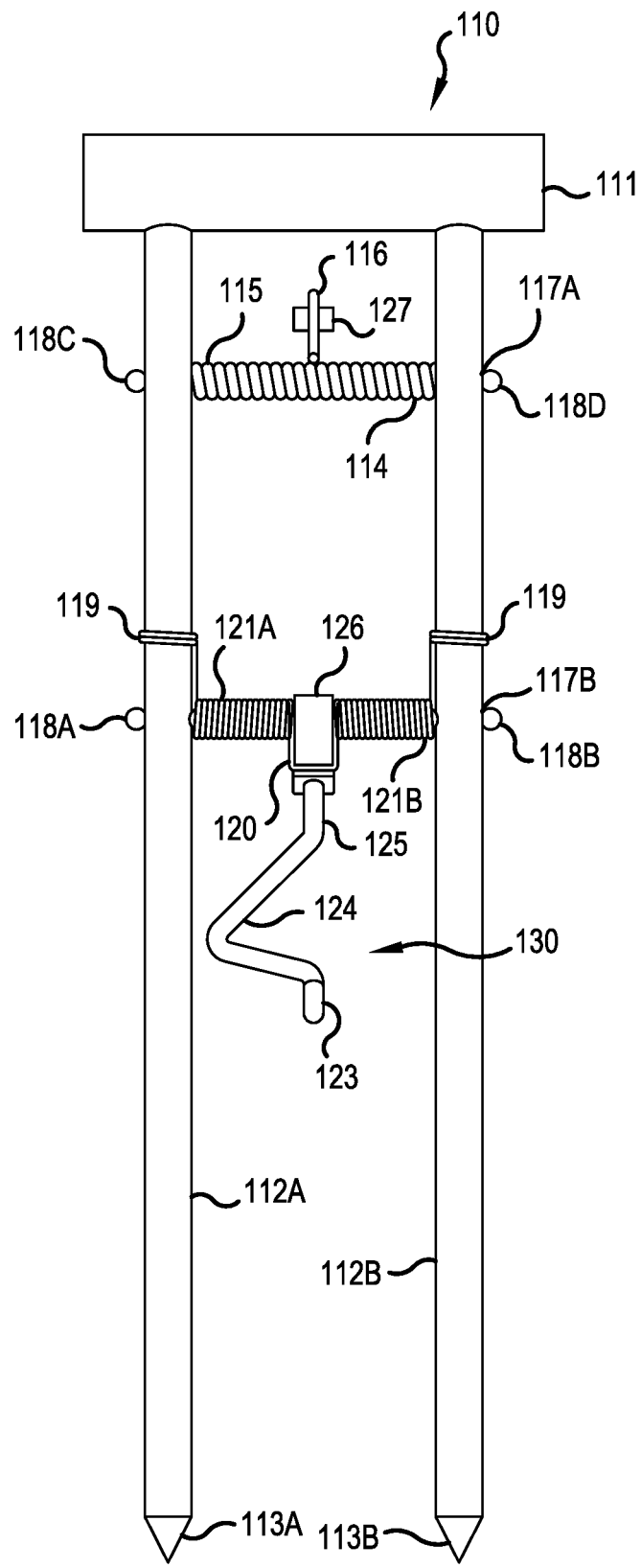
FIG. 2A is a frontal view of the trap of FIG. 1A in a tripped position, showing the trap after the trap has been tripped. A trigger-wire is shown rotated up and out of the way of the hammer while the hammer is shown swung down to an approximate point of contact with an animal.
Figure 2B:
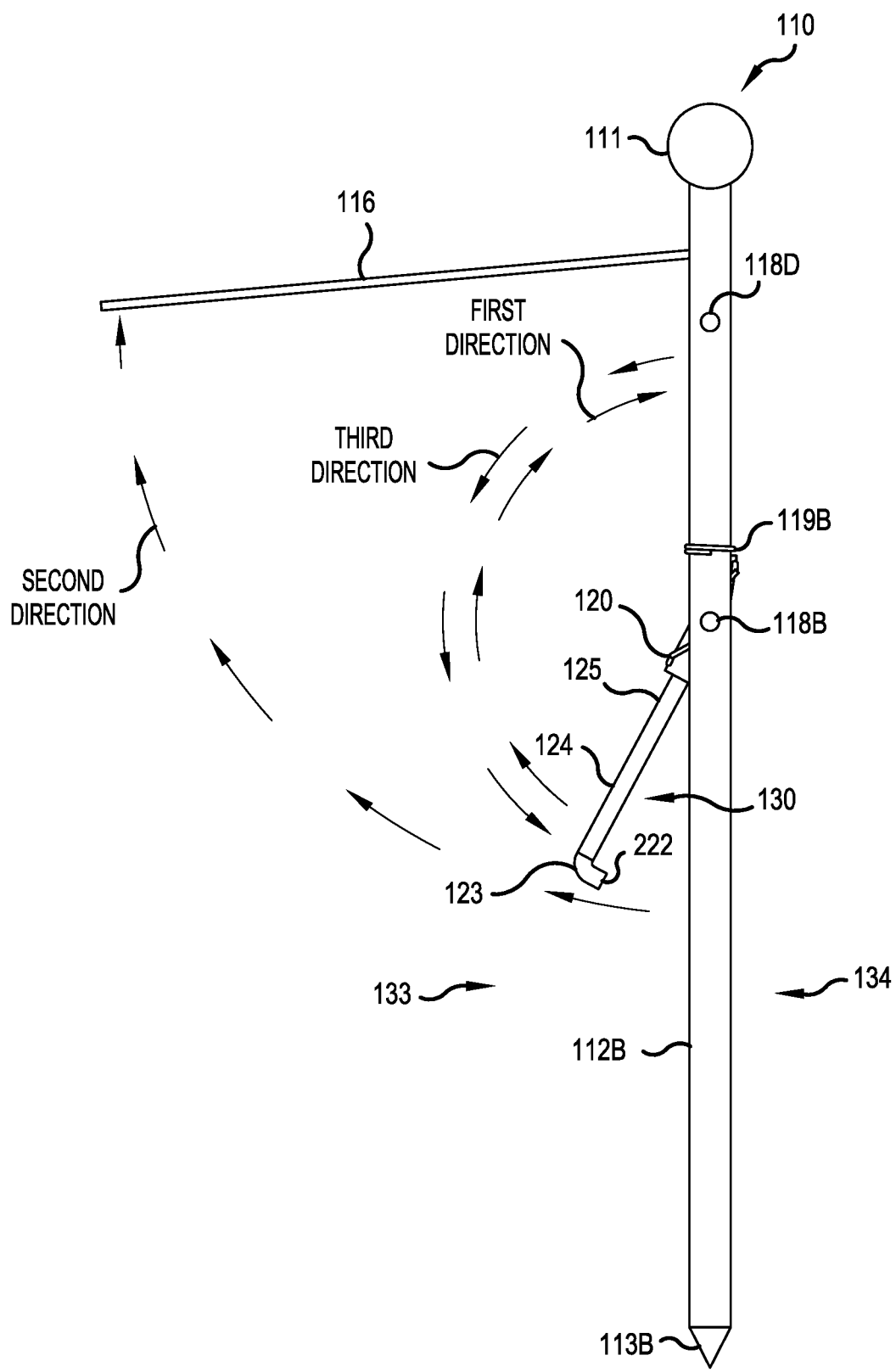
FIG. 2B is a right side view of the trap of FIG. 1A in the tripped position of FIG. 2A, showing directions of movement of a hammer and trip wire.

In discussing operation of the trap 110 (e.g. how to use it), reference is made to first, second, and third directions as indicated on FIG. 2B. The first procedure discussed is the cocking of trap 110. This first procedure is discussed relative to FIGS. 1A-2B. Trap 110 is cocked by rotating the hammer 130 around in a first direction (e.g., first direction to cock as shown in FIG. 2B—arc about lower crossmember 117B) against the spring tension of the double torsion spring 135 until the hammer face 222 passes the sear 127 moving in the first direction. The hammer face 222 is then lodged against the sear 127. When the sear 127 is lodged against the hammer face 222, the trigger-wire 116 is configured to be positioned between legs 112A, 112B. The hammer 130 is held in place in this cocked position until the trigger-wire 116 is moved (See cocked position with sear 127 lodged against hammer face 222 in FIG. 3B).

The above first procedure may be performed by a user (not shown) gripping the cocking lever 124 to keep fingers clear of the trigger-wire 116 and moving the hammer head 123 past the sear 127 to lodge the hammer face 222 of hammer head 123 against the sear 127. As the user releases the cocking lever with the hammer face 222 lodged against the sear 127, the trap 110 is in the cocked position.

A second procedure, the placement of trap 110 is now discussed relative to FIGS. 1A-2B. To deploy the trap 110 (which is configured for outdoor use), its legs 112A, 112B are driven into the ground (e.g., via handle 111 and with points 113A, 113B) to a point where the end of the trigger-wire 116 is just above the ground and at the center of a den opening (not shown) or along a path and placed in such a way that the only easy avenue for the rodent to take is past the trigger-wire 116. The trap 110 can be placed at just about any angle (i.e, relative to the ground) as long as the trigger-wire 116 has a clear path to swing. And in a case where the rodent hole is perpendicular to the ground the trap 110 may be simply laid on the ground face up (e.g., with front 133 facing upward relative to the ground) with the trigger-wire 116 centered over the hole. Even though the above discusses the first procedure of cocking the trap 110 before the second procedure of placement of the trap 110, this is a matter for user preference. The order of these procedures may be reversed.

When an animal presses against the trigger-wire 116 it is configured to move with little resistance (in the second direction—similar to third direction but in an arc about upper crossmember 117A, e.g. as shown in FIG. 2B) because of the sear 127 is smooth. As the trigger-wire 116 moves the sear 127 slides up the hammer face 222 to the point where it releases the hammer head 123. At the instant the hammer head 123 starts to move with the built-up energy between the hammer face 222 and sear 127, the hammer head's 123 energy sliding against the sear 127 causes the trigger-wire 116 to pivot up (e.g., in second direction as shown in FIG. 2B) and out of the way of the hammer head 123. Released from the sear 127, the hammer head 123 swings around in an arc (in a third direction, opposite the second direction) in an arc about the lower crossmember 117B, e.g., see FIG. 2B), very fast, to strike the rodent with enough force to kill it.

From the cocked position discussed above, the trap may be placed in a safe configuration for carrying or storage. With the hammer face 222 lodged against the sear 127, a user may be manually release the sear 127 from the hammer face 222 while holding onto the cocking lever 124. The user may then allow the hammer 130 to do an almost 180 degree rotation in the third direction until the hammer face 222 lodges against the trigger coil 114 and spacer 115, supported by upper crossmember 117A. The trap is then in the safe configuration for carrying or storage.

Because the trap 110 is placed at den openings and across paths so an animal must push on the trigger-wire 116 to get past there is no need for bait of any kind. And because there is no bait, and because the hammer 130 and trigger 129 are only triggered in one direction, it is much safer than other traps that require bait around pets and other nontargeted animals, such as birds.

Possible techniques for building a particular embodiment that is consistent with FIGS. 1A-2B, and 4 are now discussed. All dimensions discussed below are for this particular embodiment and are given to facilitate understanding of example proportions, building techniques, and general principles. These dimensions are not intended to be limiting. Other embodiments may use different dimensions, proportions, and may use different building techniques. Similarly, specific techniques discussed below are illustrative only, and not limiting. For example, traps with different sizes, shapes, and proportions may be used for trapping rodents of different sizes, species, or of different habitats.

Consistent with this particular embodiment, the handle 111 is made from a single piece of steel rod (e.g., sized 0.625×3.0 inches) with single holes drilled completely through the rod and evenly spaced from the center point of the handle 111 to a point approximately 55% to 60% of the distance to the end of the handle 111 (which in this particular embodiment is about 0.9" from the centerpoint) giving enough space between the legs 112A, 112B (which in this particular embodiment is 1.5") to have room for a targeted rodent (for this particular embodiment a vole) to get through but not enough room to get by the trigger-wire 116 without moving it. The spacing may be different for different target rodents. For example, for larger rodents such as a marmot, the spacing between the legs would be wider. And the entire trap may need to be larger.

For this particular embodiment holes for crossmembers 117A, 117B are drilled into the legs 112A, 112B, respectively, and the legs lower ends are sharpened (e.g., to form points 113A, 113B, respectively, before inserting the upper ends (e.g. ends 136A, 136B of legs 112A, 112B of FIG. 2A) approximately 75% of the way into the holes in the handle 111. After lining up the holes for the crossmembers 117A, 117B, the legs 112A, 112B and handle 111 are held in place while the legs 112A, 112B are welded to the handle 111. This weld also fills in a gap at the top of the legs 112A, 112B and leaves just a small dimple in the top of the handle 111 where the hole was. After welding the legs 112A, 112B in place, the torsion springs 121A, 121B are aligned between the legs 112A, 112B and the preformed end coils 119A, 119B are slid up the legs 112A, 112B until the torsion springs 121A, 121B are in place over the lower crossmember holes (i.e. for inserting lower crossmember 117B). Then the hammer 130 is held in place along with the springs 121A, 121B while the crossmember 117B is inserted through the legs 112A, 112B, springs 121A, 121B and hole 462 of hammer base 126. After inserting the lower crossmember 117B the hammer 130 is wound backward around the crossmember 117B, thus building spring tension as it is wound. Then while holding the tension the hammer 130 is held in place behind a plane defined by the legs 112A, 112B (and where upper crossmember 117A will be inserted) as the trigger coil 114 and trigger spacer 115 are also held in place and the upper crossmember 117A is inserted through the legs 112A, 112B and trigger assembly 450. After inserting this crossmember 117A the hammer 130 is released into a safe configuration in which hammer face 222 is stationed behind legs 112A, 112B pressing against the back of the trigger coil 114 and spacer 115, supported by the upper crossmember 117A. Next the length of hammer 130 is adjusted, if needed, by slight bending so that the trigger-wire 116 sets evenly on top of it when cocked and the hammer face 222 and sear 127 are checked for fit. Finally, the trap 110 may be tested for operation and if there are no problems the ends of crossmembers 117A, 117B are heated to the melting point forming balls 118A-118D to keep them held loosely in place between the legs 112A, 112B.

In this particular embodiment, the sear 127 may be constructed from a section of brass rod that is cut to length and drilled for form a hole. High strength wire for the trigger-wire 116 may then be inserted in the hole. This high strength wire may or may not be the same high strength wire used for the trigger coil 115. In some embodiments a single high strength wire is used for both. That is, the same high strength wire may be used for both the trigger coil 115 and the trigger-wire 116, with the high strength wire being passed through the hole for sear 127 and then bent into the shape that allows the trigger-wire 116 to hang between legs 112A, 112B when the trap 110 is cocked. In other embodiments a different high strength wire may be used for each. Sear 527 (discussed below for FIGS. 5A-6B) could be formed similarly.

Other embodiments are now described.

Figure 3A:
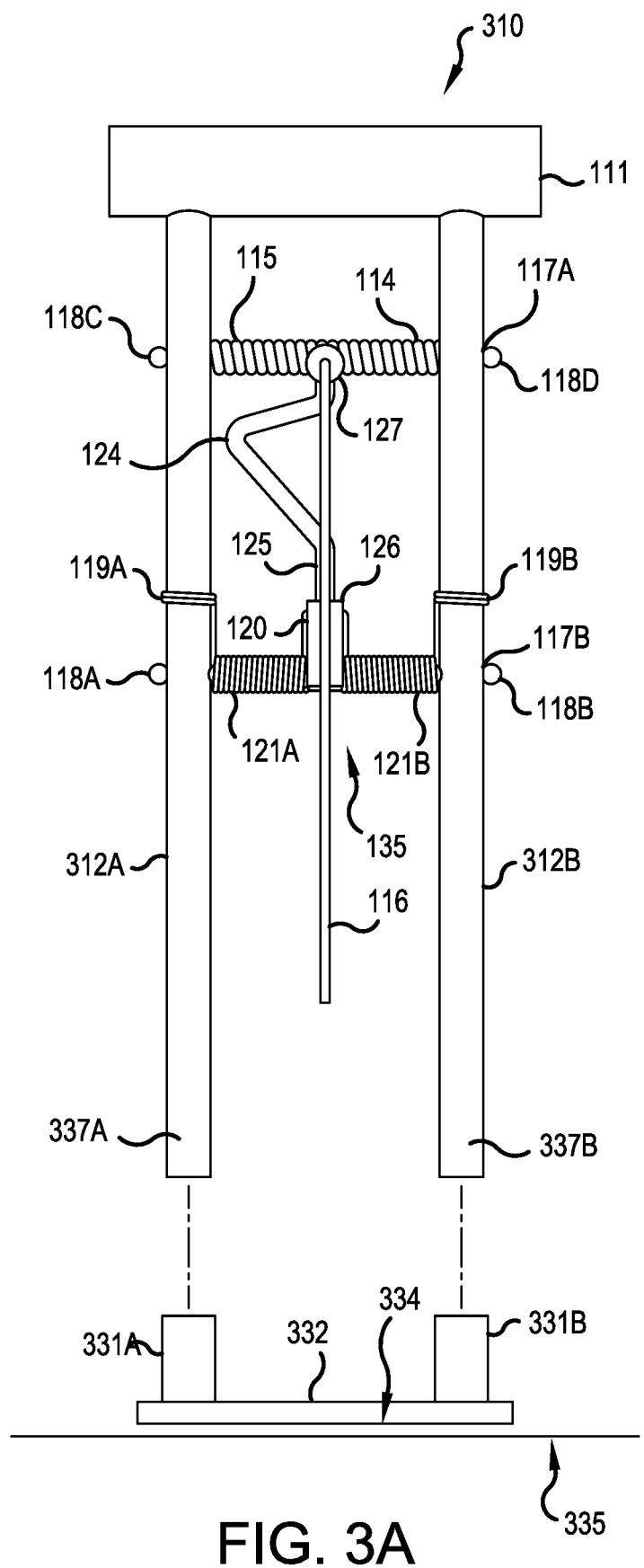
FIG. 3A is a frontal view of a trap, consistent with some embodiments, that has similarities to the trap of FIG. 1A, but with shorter legs and with a base support for placing on a floor and other differences.
Figure 3B:
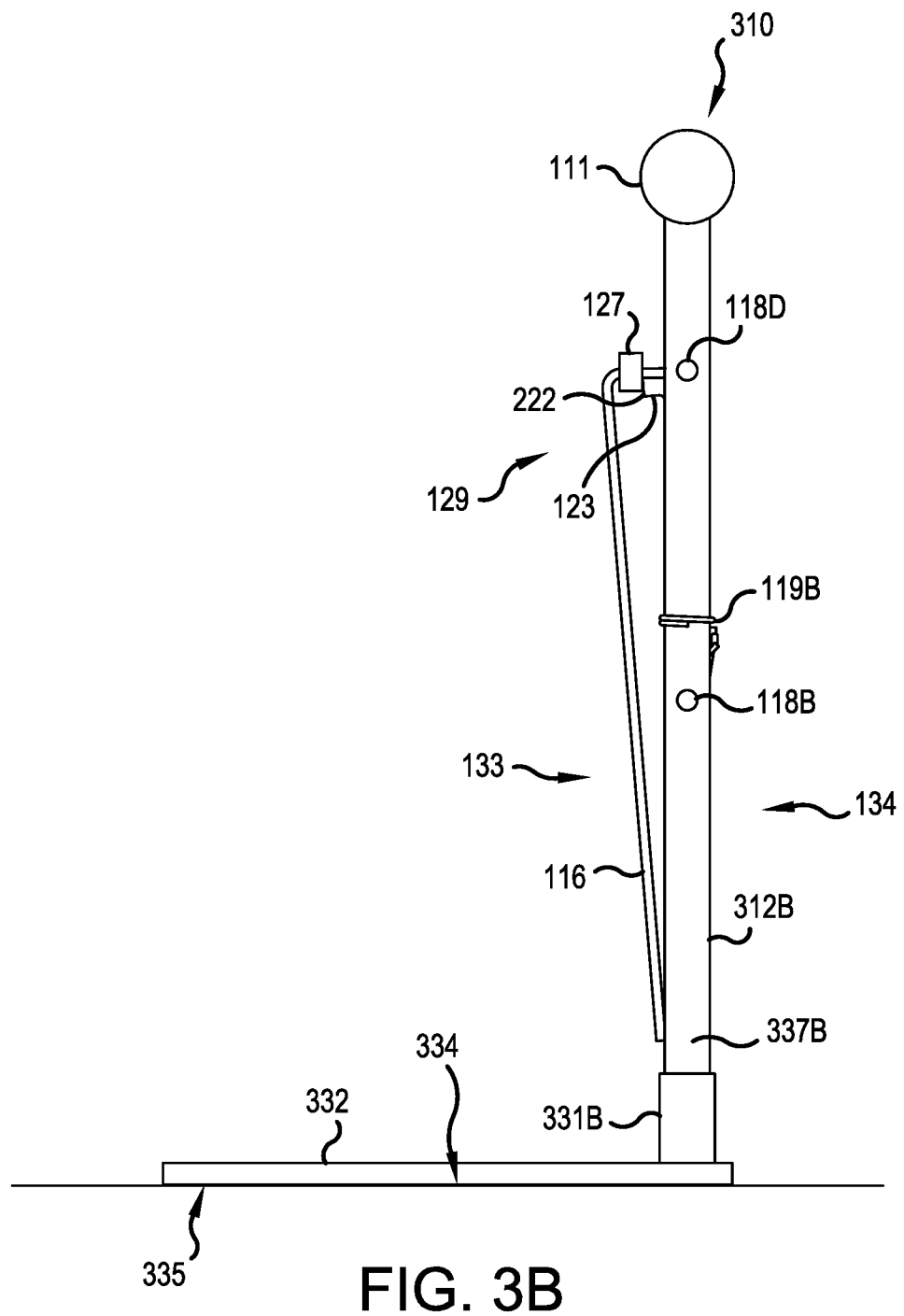
FIG. 3B is a right side view of the trap of FIG. 3A, showing the trap in a cocked configuration.

Referencing FIGS. 3A and 3B, a "short leg" indoor embodiment is now described. This short leg embodiment is the same as FIG. 1 (i.e., except as indicated reference numbers indicate same structure as in FIGS. 1A-2B and 4) except that it has shorter legs 312A, 312B, which are configured to be inserted (e.g., via ends 337A, 337B), into, respectively, sleeves 331A, 331B which are coupled with or integral with a base 332 made of metal or plastic for use indoors. Base 332 includes a flat surface 334 for standing the trap 310 on a flat surface 335, such as a floor. For the trap 310 to function properly the base should be anchored to the floor in some way to prevent loss of power to the hammer 130 due to the trap 310 slipping when triggered. This can be done in many ways, using a weighted base made of metal, hook & loop tape or screws to name a few. The trap 310 is intended to be placed on a floor with its back (i.e. rear side 134) against a wall with an opening in it, something such as a chew hole or some similar opening that rodents like to use, so that an animal using that hole must engage the trigger-wire 116 the next time it enters the structure.

Referencing specifically FIG. 3B, this short leg embodiment is shown in a cocked position with hammer face 222 buttressed against sear 127. This is in contrast to FIGS. 1A-2B and 4, in which hammer face 222 and sear 127 are not in contact. For example, referencing FIG. 1B, sear 127 is not shown in contact with hammer face 222. Instead, trap 110 is shown in a safe configuration (discussed above relative to FIG. 1B).

Figure 5A:
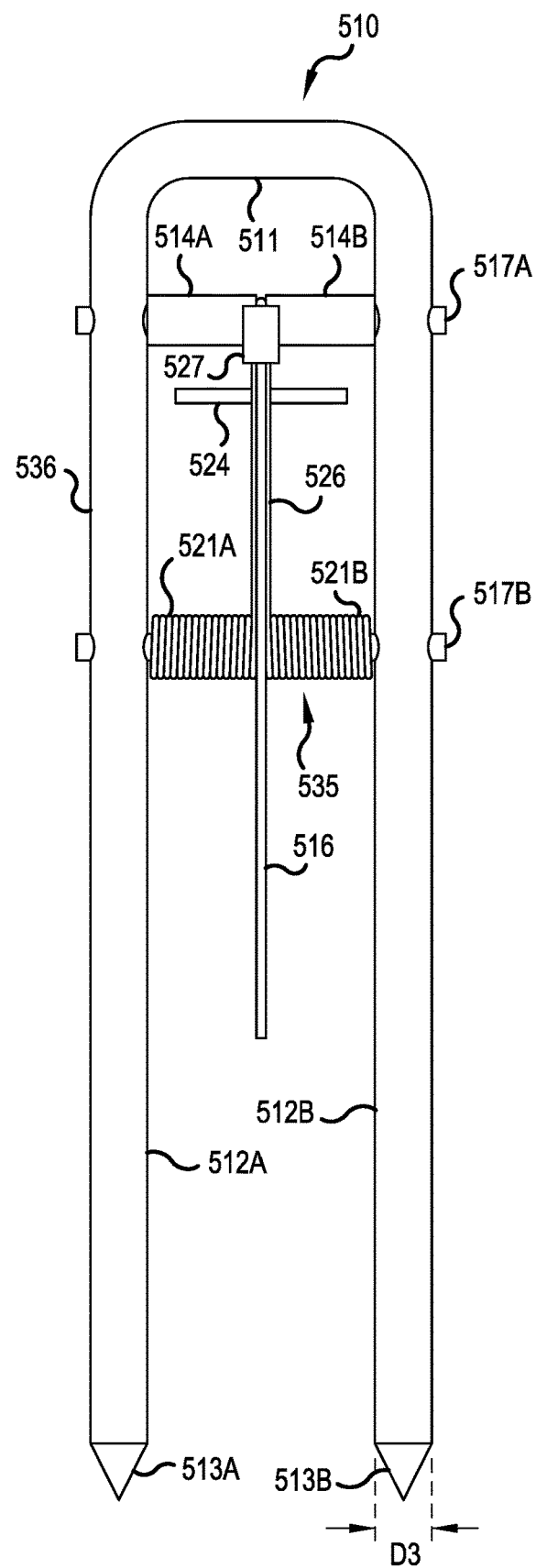
FIG. 5A is a frontal view of a trap, consistent with some embodiments, with a handle integral with the legs formed by shaping a rod into a U shape, showing the U shape.
Figure 5B:
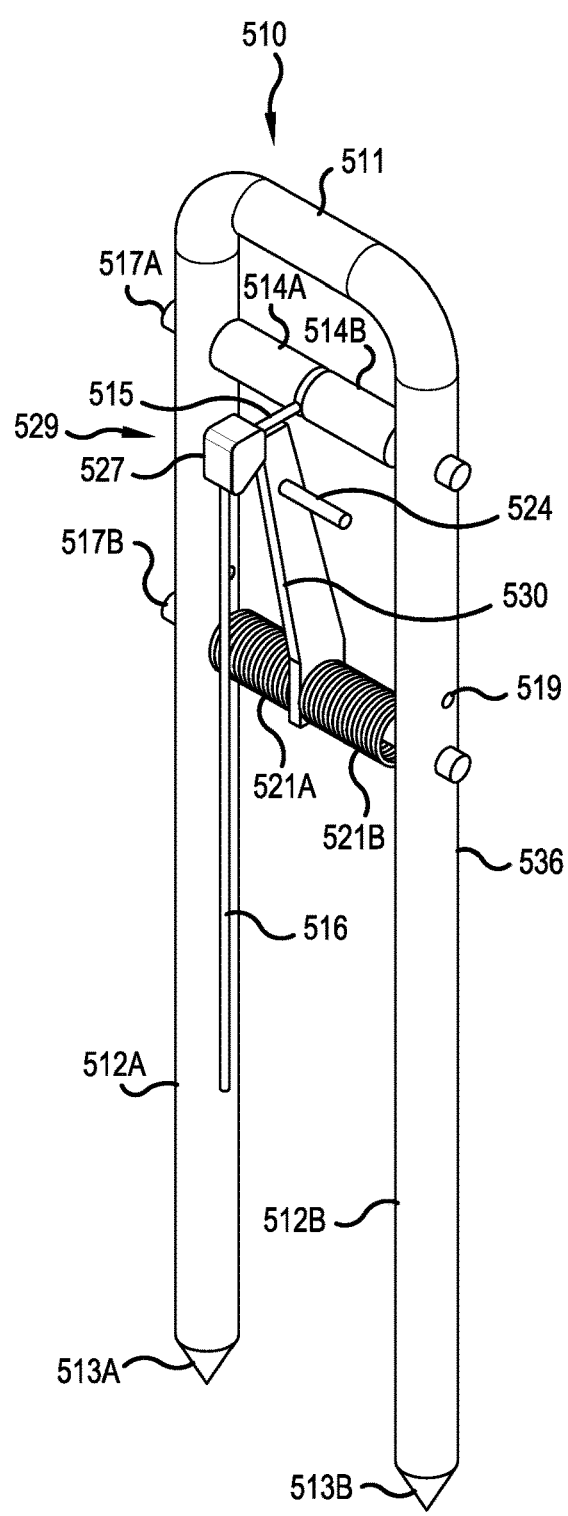
FIG. 5B is a three-dimensional perspective view of the trap of FIG. 5A.

Referencing FIGS. 5A and 5B, a "U-shaped" embodiment is shown. This U-shaped trap 510 uses a single section of steel rod 536 formed into a U shape for the trap frame with the trigger 529 and hammer 530 between the legs 512A, 512B. The U-shaped bend forms handle 511 which may be used to drive legs 512A, 512B into ground via points 513A, 513B. The legs 512A, 512B on this trap 510 are larger than legs 112A, 112B. For example, in some embodiments legs 512A, 512B may have a ½ inch diameter (i.e., diameter D3 of FIG. 5A) versus a diameter of 5/16 inch (i.e., diameter D2 of FIG. 1A) for legs 112A, 112B of trap 110 in FIG. 1 (these specific dimensions are only examples to convey basic principles and should not in any respect be limiting). The larger diameter of legs 512A, 512B (which is also same diameter for handle 511) adds weight (and inertia) to the trap frame to prevent loss of power to the hammer 530 when the trigger 529 is tripped. On this trap 510 the crossmembers 517A, 517B are pressed or welded into place. This trigger coil 515 has only a single loop around the crossmember 517A before extending out to connect with sear 527. In some embodiments, a high strength wire that forms trigger coil 515 continues through sear 527 to form trigger-wire 516. Trigger coil 515 is centered by two metal or plastic spacers 514A. 514B. And the sear 527 of trigger 529 is molded onto the trigger-wire 516 during manufacturing. The hammer 530 in this figure is a solid piece of light weight harden aircraft type metal with a cocking lever 524 molded to it. Hammer 530 is positioned to receive torque from double torsion spring 535 with springs 521A, 521B whose ends are anchored in holes in legs 512A, 512B (e.g. spring end 519 shown anchored in a hole in FIG. 5B). Otherwise, the principles and method of operation regarding trap 110 of FIGS. 1A-2B and 4 are applicable to the principles and operation of trap 510.

Although trap 510 is shown as described with points 513A, 513B for driving legs 512A, 512B into ground, that is just one possibility. In some embodiments, a trap with a frame similar to trap 510 could be configured with sleeves and a base for indoor use on a floor, similar to trap 310 of FIGS. 3A and 3B.

Possible techniques for building a particular embodiment that is consistent with FIGS. 5A and 5B are now discussed. All dimensions discussed below are for this particular embodiment and are given facilitate understanding of example proportions, building techniques, and general principles. These dimensions are not intended to be limiting. Other embodiments may use different dimensions, proportions, and may use different building techniques. Similarly, specific techniques discussed below are illustrative only, and not limiting. For example, traps with different sizes, shapes, and proportions may be used for trapping rodents of different sizes, species, of different habitats.

Consistent with FIGS. 5A and 5B the particular embodiment includes a trap 510 made from a single length of steel rod 536 formed in the shape of an upside-down U. The rod used on this trap 510 is larger than the legs 112A, 112B on the trap 110 of FIG. 1 for a couple of reasons. One reason is to create a handle that is easier to grip than a smaller rod would be, making the trap 510 safer to operate. And another reason is adding weight to the overall trap 510 to offset any torque created by the hammer 530 when tripped.

This particular embodiment may be constructed by using a predetermined length of rod (e.g. rod 536) with the ends ground to a point (e.g. points 513A, 513B) and holes drilled through it for the crossmembers 517A, 517B and in this version holes for the spring ends (e.g. spring end 519 of FIG. 5B).

Rod 536 may be bent with hand tools such as a hammer, torch, and vice. For example, rod 536 may be placed vertically in a vice to a point past the center depending on how wide a trap 510 is desired. Then the rod may be heated and bent 90 degrees. Then, the rod may be repositioned 180 degrees in the vice so that the rod is again oriented vertically but in an opposite direction. The rod 536 may then be bent 90 degrees again to form a full 180 degree bend with the legs of approximately equal length. Alternatively, a press may be used for the bend. That is clamps and steel blocks could be used to hold the center section in place and bend each leg into position with a press ram.

After holes are drilled the rod 536 is then centered in a custom-made press that will bend the rod forming the legs with the crossmember holes lining up after bending. The hammer 530 and springs 521A, 521B are installed similarly as for the trap 110 in FIG. 1. The only difference being in this one the spring ends are held in place by inserting coil ends (e.g. spring end 519) through the holes in the legs 512A, 512B instead of coil ends (e.g. as in 119A, 119B of FIG. 1A) that wrap around the them. The trigger 529 is installed in the same or similar manner as for the trap 110 in FIG. 1 with the trigger-wire 516 centered in the trap 510 by spacers 514A, 514B. Because the legs 512A, 512B are larger diameter (e.g. diameter D3 compared to diameter D2 of FIG. 1) on this trap 510 the crossmembers 517A, 517B may be made to be press fitted in place rather then melting the ends to form balls as in FIGS. 1A and 1B.

The construction of trap 610 of FIGS. 6A, 6B (discussed below) is similar to the construction of trap 510 because trap 610 has the same frame (e.g., for handle 511 and legs 512A, 512B) as the trap 510 of FIGS. 5A, 5B. In trap 610 the hammer 630 is offset to one side in order to allow for a single torsion spring 621. But the construction is very similar as for trap 510 discussed above. On either one of the traps 510 or 610 the triggers, sears, hammers and springs could be in any number of configurations and no one trap should be considered limited to any one configuration.

Figure 6A:
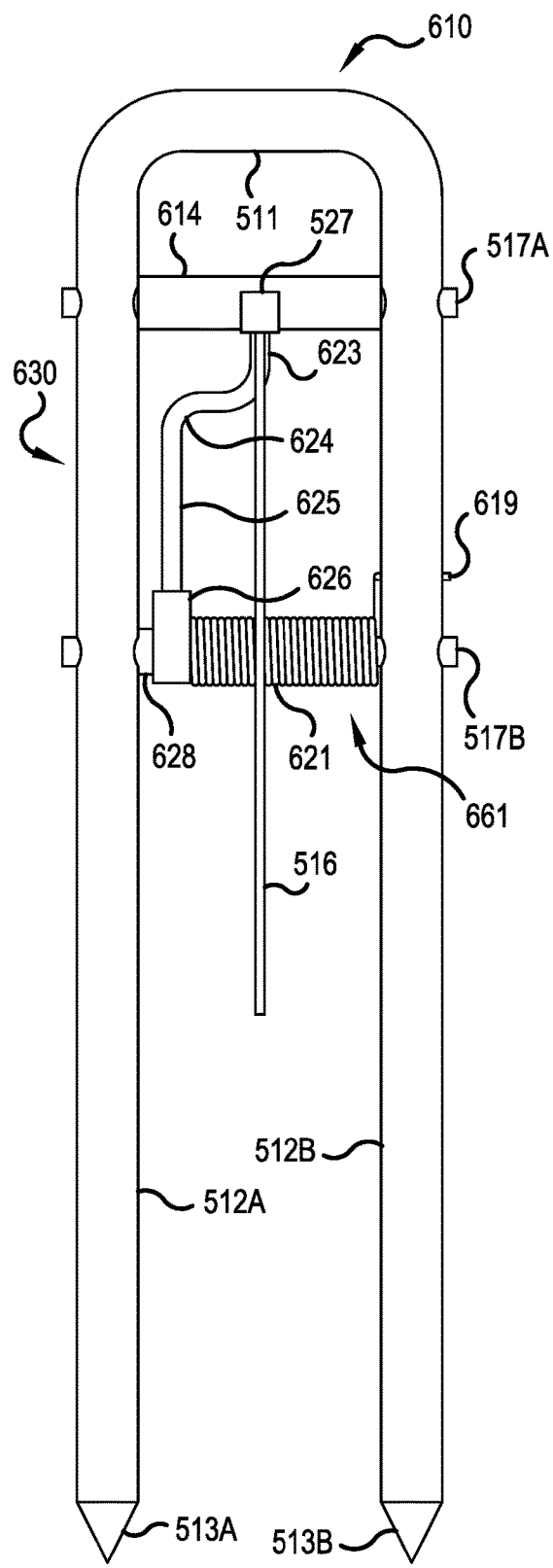
FIG. 6A is a frontal view of a trap, consistent with some embodiments, similar to the trap of FIG. 5A, but with a differently configured hammer, a single torsion spring on a lower crossmember, and a single sleeve on an upper crossmember.
Figure 6B:
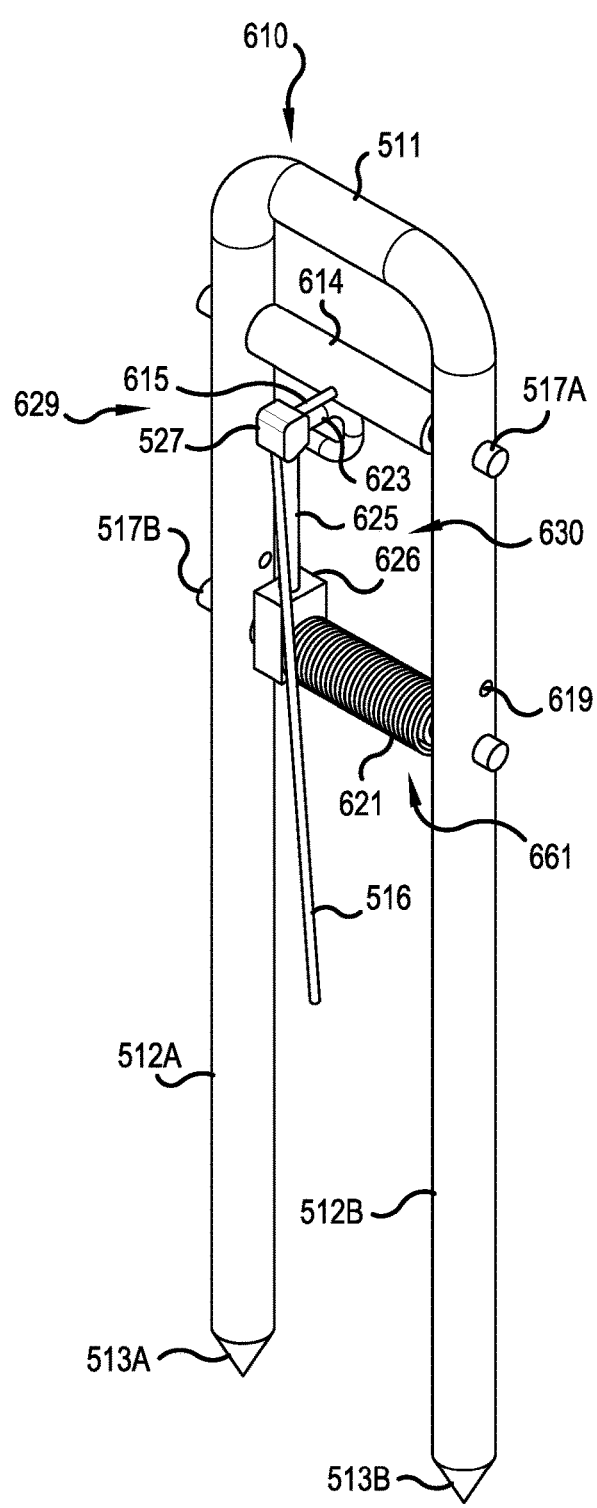
FIG. 6B is a three-dimensional perspective view of the trap of FIG. 6A.

Referencing FIGS. 6A and 6B, another U-shaped embodiment is shown. Trap 610 has at least similar structures (reference numbers in FIGS. 6A, 6B indicate the same structure as those same numbers in FIGS. 5A, 5B) to trap 510 of FIGS. 5A and 5B, except as discussed herein. But trap 610 has a single length of sleeve 614 (compared to spacers 514A, 514B of trap 510) mounted on the upper crossmember 517A to create a hinge point between the legs 512A, 512B. A connector member 615 (e.g., may be composed of high strength wire) may be mounted to sleeve 614 at one end and to sear 527 on an opposing end. Sear 527 is attached to the trigger-wire 516, together with connector 615 making up the trigger 629. On trap 610 the hammer 630 is shown offset with an inner sleeve 628 over the lower crossmember 517B for the purpose of using a single torsion spring 621 (e.g., an other example of a bias mechanism 661) mounted over lower crossmember 517B. The torsion spring end 619 is anchored to leg 512B through holes in the leg 512B and the other spring end (not shown) is attached to the hammer base 626. Trap 610 is also shown in cocked position in FIG. 6B with sear 527 braced against hammer head 623.

Trap 610 has a hammer 630 with a somewhat different shape than hammer 130 of trap 110. A length of high strength wire extends from hammer base 626 forming hammer shaft 625 and continues until it has two approximately 90 degree bends (as shown: a first bend to right as viewed from front view of FIG. 6A and then a second bend toward center of crossmember 517A) to form cocking lever 624, which has a shape similar to an "S." As high strength wire approaches vicinity of sear 527 it has another approximately 90 degree bend (as shown) to form hammer head 623. The principles and method of operation regarding trap 110 of FIGS. 1A-2B and 4 are applicable to the principles and operation of trap 610.

Figure 7A:
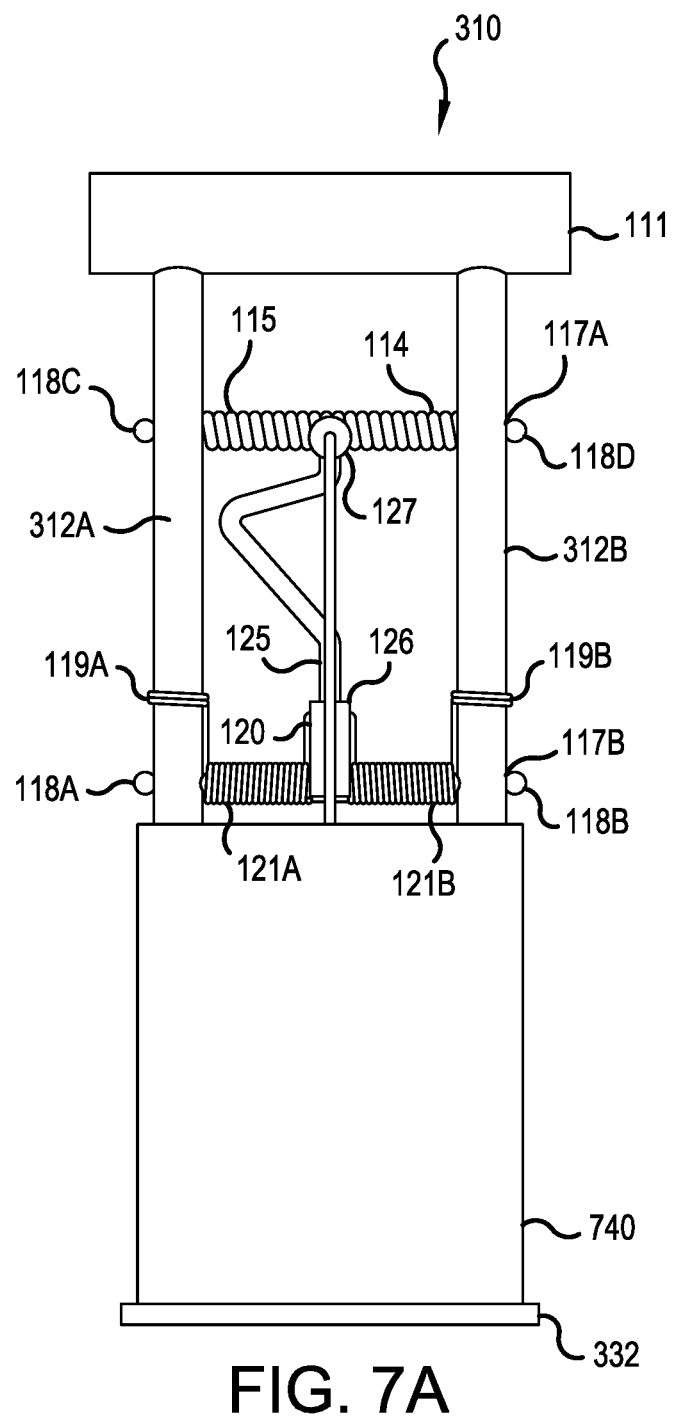
FIG. 7A is a frontal view of a the trap of FIGS. 3A and 3B, but with a partial cardboard partition disposed around the front of the base blocking access to the front of the trap but allowing access to the rear of the trap.
Figure 7B:
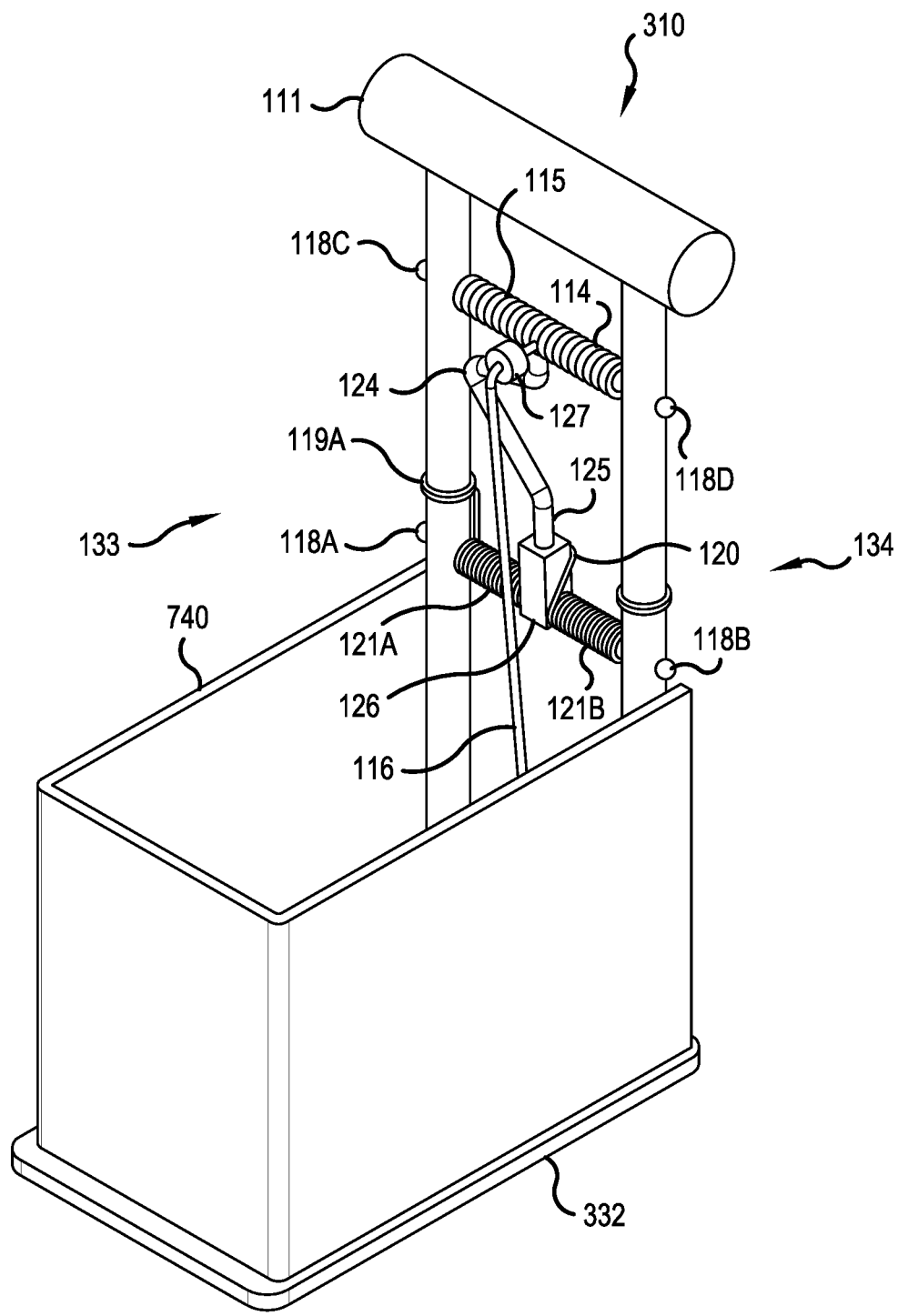
FIG. 7B is a three-dimensional perspective view of the trap of FIG. 7A.

Referencing FIGS. 7A and 7B, the trap 310 of FIGS. 3A and 3B is shown set up to trap mice is described (reference numbers in FIGS. 7A, 7B indicate the same structure as the same reference numbers in FIGS. 3A, 3B). As previously stated, in general, embodiments described herein do not require bait when used along trails and at rodent dens. However, that is not to say that no bait can be used. Bait is an option. Mice present several challenges. They have small heads compared to other rodents and so are a smaller target for a hammer head 123. Their trails and dens may be difficult to find. The challenges presented by mice can be addressed in at least two ways. First, bait may be used by sliding a small piece of fruit, about the size of a raisin, up the end of a trigger-wire 116. Second, a barrier 740 may be shaped and positioned to require mice to approach trap 310 from a rear side (e.g., rear 134 of FIGS. 1B and 2B), opposite the direction in which a hammer head 123 will swing. In some cases, the barrier 740 may be something as simple as cardboard. Barrier 740 may be placed around the base 332 blocking access to the front 133 of the trap 310 and requiring access to trip wire 116 from the rear 134. The barrier 740 does not have to be very high as shown and the trigger-wire 116 needs to be able to clear it when tripped. An approaching mouse is going to be attracted to the bait on trigger-wire 116 but prevented from accessing trigger-wire 116 except from rear 134 (as shown) of trap 310. When the mouse contacts trigger-wire 116 trying to get the fruit off it trips trap 310. Although FIGS. 7A, 7B depict trap 310 with barrier 740 placed about base 332, in other embodiments barrier 740 may be used with an outdoor embodiments such as trap 110 of FIGS. 1A-2B and 4, trap 510 of FIGS. 5A, 5B or trap 610 of FIGS. 6A, 6B.

Some embodiments are now discussed.

In a first embodiment a rodent kill trap includes at least a handle (e.g. 111 or 511), and at least first and second legs (e.g. 112A/112B, 312A/312B or 512A/512B) that are at least one of fixedly coupled with (e.g. press fit into holes pre-drilled into the handle) or integral with (e.g. welded together or formed of single bent U-shaped metal bar) the handle and that are configured to be positioned via the handle (e.g. driven into ground via points (e.g., points 113A, 113B or 513A, 513B) at end of legs or stood on surface with base (e.g. base 332 and sleeves 331A, 331B).

The first embodiment further including at least first and second parallel crossmembers (e.g., 117A, 117B or 517A, 517B) coupled with and extending between the first and second legs, the first crossmember (e.g. 117A or 517A) being closer to the handle than the second crossmember (e.g. 117B or 517B).

The first embodiment further including at least a trigger (e.g. 129, 529, or 629) rotatably coupled with the first crossmember (e.g., 117A or 517A), the trigger including at least a length of the trigger (e.g., trigger-wire 116 or 516) extending away from the first crossmember.

The first embodiment further including at least a hammer (e.g., 130, 530, or 630) rotatably coupled with the second crossmember (117B or 517B) and in engaging contact with a bias mechanism (double torsion spring 135 or single torsion spring 621) that resists rotation of the hammer about the second crossmember.

And the first embodiment further including at least a sear (e.g. 127 or 527) as part of the trigger (e.g. 129, 529, or 629) configured for being braced against the hammer (e.g., 130, 530, or 630) in a cocked position (see e.g., sear 127, hammer head 123 in FIG. 3B; sear 527, hammer 530 in FIG. 5B; or sear 527, hammer head 623 in FIG. 6B) in which the hammer is rotated about the second crossmember in opposition to the bias mechanism and wherein if the length of the trigger member is engaged by a rodent the sear is configured to be dislodged from the hammer (See e.g., FIG. 2B) thereby releasing the hammer to rotate in an arc to strike the rodent.

The rodent kill trap of the first embodiment may optionally include wherein the handle has a diameter (e.g., diameter D1 of FIG. 1A) that is at least twice a diameter of at least the first leg (e.g., diameter D2).

The rodent kill trap of the first embodiment may optionally include wherein the handle (e.g. 511) and the first and second legs (e.g., 512A, 512B) are each formed with a single metal bar (e.g. metal rod 536) formed into a U shape (See e.g., FIGS. 5A, 5B).

The rodent kill trap of the first embodiment may optionally include wherein the handle includes at least a first metal bar and the first and second legs include at least, respectively, second and third metal bars, the first bar being attached to ends (e.g., ends 136A, 136B) of the second and third bars (e.g. legs 112A, 112B) via at least one of welding, bolting, or press fitting (See e.g., FIGS. 1A, 1B).

The rodent kill trap of the first embodiment may optionally include wherein the handle is composed at least partly of steel.

The rodent kill trap of the first embodiment may optionally include wherein the handle is at least one of fixedly coupled with or integral with an end (e.g. 136A) of first leg (e.g. 112A) and an end (e.g. 136B) of second leg (e.g. 112B).

The rodent kill trap of the first embodiment may optionally include wherein the first and second legs (e.g., 112A, 112B or 512A, 512B) include, respectively, at least first and second points (e.g., 113A, 113B or 513A, 513B) configured for penetrating ground.

The rodent kill trap of the first embodiment may optionally include wherein the first and second legs (e.g. 312A, 312B) are coupled (e.g. at least partly via ends 337A, 337B) with a base (e.g. via sleeves 131A, 131B of base 332) that is configured for supporting the trap on top of a surface.

The rodent kill trap of the first embodiment may optionally include wherein the first and second legs are composed at least partly of steel.

The rodent kill trap of the first embodiment may optionally include wherein the first and second crossmembers are each composed at least partly of high strength wire.

The rodent kill trap of the first embodiment may optionally include wherein the bias mechanism is at least one of a single torsion spring (e.g. 621) or a double torsion spring (e.g. 135 or 535).

The rodent kill trap of the first embodiment may optionally include wherein the trigger (e.g. 129, 529, or 629) includes at least a trigger that is rotatably coupled with the first crossmember (e.g. 117A or 517A) by being at least one of affixed or integral with an end of a trigger coil (e.g. trigger coil 114 of FIG. 4, 515 of FIG. 5B, or 615 of FIG. 6B) that is at least partially wrapped about the first crossmember, the trigger including the sear (e.g. 127 or 527) and the length of the trigger being a trigger-wire (e.g. 116 or 516) extending away from the first crossmember. The sear may be optionally composed at least partly of a metal that is at least resistant to at least one of rust or corrosion (e.g. brass). And the trigger-wire may be optionally be composed at least partly of high strength wire. And the trigger-wire may be optionally configured, when the sear is braced against the hammer in a cocked position (see e.g., sear 127, hammer head 123 in FIG. 3B; sear 527, hammer 530 in FIG. 5B; or sear 527, hammer head 623 in FIG. 6B), to extend from the sear to a position between the first and the second legs.

The rodent kill trap of the first embodiment may optionally include wherein the hammer includes at least a hammer (e.g. 130, 530, or 630) rotatably coupled with the second crossmember (e.g. 117B or 512B) and in engaging contact with at least one of a single torsion spring (e.g. 621) or a double torsion spring (e.g. 135) that resists rotation of the hammer about the second crossmember, the hammer including at least a hammer base (e.g. 126 or 626) that is rotatably affixed to the second crossmember, a hammer shaft (e.g. 125 or 625), a cocking lever (e.g. 124, 524, or 624) configured for gripping by a user, and a hammer head (e.g. 123 or 623) for engaging the sear (e.g. 127 or 527) and for striking a rodent. And the hammer base (e.g. 126 of FIG. 1) may further optionally be centered about the second crossmember (e.g. 117B) spaced equally from the first and second legs (e.g. 112A, 112B) and the hammer base (e.g. 126 or 626) optionally further include a first hole 463 for receiving the hammer shaft and a second hole 462 through which the second crossmember extends.

The rodent kill trap of the first embodiment may optionally further include wherein the hammer is formed at least partly of steel.

In a second embodiment a rodent kill trap includes at least a handle (e.g. 111 or 511) and at least first and second legs (e.g. 112A, 112B or 512A, 512B) with at least first and second points (e.g. 113A, 113B or 613A, 613B), with the at least first and second legs being at least one of fixedly coupled with or integral with the handle, the first and second legs being configured to be driven into ground via the first and second points with the handle.

The second embodiment (see e.g. FIGS. 1A-2B, 4, 5A-6B) further includes at least first and second parallel crossmembers (e.g. 117A, 117B or 517A, 517B) coupled with and extending between the first and second legs (e.g. 112A, 112B or 512A, 512B), the first crossmember (e.g. 112A or 512A) being closer to the handle than the second crossmember (e.g. 112B or 512B).

The second embodiment further includes at least a trigger (e.g. 129, 529, or 629) rotatably coupled with the first crossmember, the trigger including at least a sear (e.g. 127 or 527) and trigger-wire (e.g. 116 or 516) at least one of coupled with (e.g., bolted or threaded to) or integral with (e.g. soldered to, welded to etc.) the sear and extending away from the first crossmember.

And the second embodiment further includes at least a hammer (e.g. 130, 530, or 630) rotatably coupled with the second crossmember and in engaging contact with at least one or more torsion springs (e.g. 135 or 621) that resist rotation of the hammer about the second crossmember.

And the second embodiment further includes wherein the sear (e.g. 127 or 527) is configured for being braced against the hammer in a cocked position (see e.g., sear 127, hammer head 123 in FIG. 3B; sear 527, hammer 530 in FIG. 5B; or sear 527, hammer head 623 in FIG. 6B) in which the hammer is rotated about the second crossmember in opposition to the one or more torsion springs (e.g. 135 or 621) and wherein if the trigger-wire is engaged by a rodent the sear is configured to be dislodged from the hammer thereby releasing the hammer to rotate in an arc to strike the rodent.

In a third embodiment (see e.g. FIGS. 3A, 3B and other Figs as applicable) a rodent kill trap includes at least a handle (e.g. 111 or 511), a base (e.g. 332) configured with a flat side 334 for resting on a flat surface 335, and at least first and second legs (e.g. 312A, 312B) having, respectively, at least first and second ends (e.g. 337A, 337B), the at least first and second ends being at least one of coupled with or integral with the base, the first and second legs being at least one of coupled with or integral with handle, and the trap being configured to be gripped by the handle to place the flat side 334 of the base on the flat surface 335.

The third embodiment further includes at least first and second parallel crossmembers (e.g 117A, 117B or 512A, 512B) coupled with and extending between the first and second legs, the first crossmember (e.g. 117A or 517A) being closer to the handle than the second crossmember (e.g. 117B or 517B).

The third embodiment further includes at least a trigger (e.g 129, 529, or 629) rotatably coupled with the first crossmember, the trigger including at least a sear (e.g. 127 or 527) and trigger-wire (e.g. 116 or 516) at least one of coupled with or integral with the sear and extending away from the first crossmember.

And the third embodiment further includes at least a hammer (e.g., 130, 530, or 630) rotatably coupled with the second crossmember (e.g. 117B or 517B) and in engaging contact with at least one or more torsion springs (e.g. 135 or 621) that resist rotation of the hammer about the second crossmember.

And the third embodiment further includes at least wherein the sear (e.g. 127 or 527) is configured for being braced against the hammer (e.g. 130) in a cocked position (see e.g., sear 127, hammer head 123 in FIG. 3B; sear 527, hammer 530 in FIG. 5B; or sear 527, hammer head 623 in FIG. 6B) in which the hammer is rotated about the second crossmember in opposition to the one or more torsion springs and wherein if the trigger-wire is engaged by a rodent the sear is configured to be dislodged from the hammer thereby releasing the hammer to rotate in an arc to strike the rodent.

Further versions (i.e. embodiments) are now discussed.

Version 1. A rodent kill trap comprising:
a handle;
at least first and second legs that are at least one of fixedly coupled with or integral with the handle and that are configured to be positioned via the handle;
at least first and second parallel crossmembers coupled with and extending between the first and second legs, the first crossmember being closer to the handle than the second crossmember;
a trigger rotatably coupled with the first crossmember, the trigger including at least a length of the trigger extending away from the first crossmember;
a hammer rotatably coupled with the second crossmember and in engaging contact with a bias mechanism that resists rotation of the hammer about the second crossmember; and
a sear as part of the trigger configured for being braced against the hammer in a cocked position in which the hammer is rotated about the second crossmember in opposition to the bias mechanism and wherein if the length of the trigger member is engaged by a rodent the sear is configured to be dislodged from the hammer thereby releasing the hammer to rotate in an arc to strike the rodent.

Version 2. The rodent kill trap of version 1, wherein the handle has a diameter that is at least twice a diameter of at least the first leg.

Version 3. The rodent kill trap of versions 1 or 2, wherein the handle and the first and second legs are each formed with a single metal bar formed into a U shape.

Version 4. The rodent kill trap of any of versions 1 or 2, wherein the handle includes at least a first metal bar and the first and second legs include at least, respectively, second and third metal bars, the first bar being attached to ends of the second and third bars via at least one of welding, bolting, or press fitting.

Version 5. The rodent kill trap of any of versions 1 through 4, wherein the handle is composed at least partly of steel.

Version 6. The rodent kill trap of any of versions 1 through 5, wherein the handle is at least one of fixedly coupled with or integral with an end of first leg and an end of second leg.

Version 7. The rodent kill trap of any of versions 1 through 6, wherein the first and second legs include, respectively, at least first and second points configured for penetrating ground.

Version 8. The rodent kill trap of any of versions 1 through 7, wherein the first and second legs are coupled with a base that is configured for supporting the trap on top of a surface.

Version 9. The rodent kill trap of any of versions 1 through 8, wherein the first and second legs are composed at least partly of steel.

Version 10. The rodent kill trap of any of versions 1 through 9, wherein the first and second crossmembers are each composed at least partly of music wire.

Version 11. The rodent kill trap of any of versions 1 through 10, wherein the bias mechanism is at least one of a single torsion spring or a double torsion spring.

Version 12. The rodent kill trap of any of versions 1 through 11, wherein the trigger rotatably coupled with the first crossmember, the trigger including at least a length of the trigger extending away from the first crossmember comprises:
a trigger that is rotatably coupled with the first crossmember by being at least one of affixed or integral with an end of a trigger coil that is at least partially wrapped about the first crossmember, the trigger including the sear and the length of the trigger being a trigger-wire extending away from the first crossmember.

Version 13. The rodent kill trap of version 12, wherein the sear is composed at least partly of a metal that is at least resistant to at least one of rust or corrosion.

Version 14. The rodent kill trap of version 12 or 13, wherein the trigger-wire is composed at least partly of music wire.

Version 15. The rodent kill trap of any of versions 12 through 14, wherein the trigger-wire is configured, when the sear is braced against the hammer in a cocked position, to extend from the sear to a position between the first and the second legs.

Version 16. The rodent kill trap of any of versions 1 through 15, wherein the hammer rotatably coupled with the second crossmember and in engaging contact with a bias mechanism that resists rotation of the hammer about the second crossmember comprises:

a hammer rotatably coupled with the second crossmember and in engaging contact with at least one of a single torsion spring or a double torsion spring that resists rotation of the hammer about the second crossmember, the hammer including at least a hammer base that is rotatably affixed to the second crossmember, a hammer shaft, a cocking lever configured for gripping by a user, and a hammer head for engaging the sear and for striking a rodent.

Version 17. The rodent kill trap of version 16, wherein the hammer base is centered about the second crossmember spaced equally from the first and second legs and wherein the hammer base includes a first hole for receiving the hammer shaft and a second hole through which the second crossmember extends.

Version 18. The rodent kill trap of version 16 or 17, wherein the hammer is formed at least partly of steel.

It will be understood by those skilled in the art that the terminology used in this specification and in the claims is "open" in the sense that the terminology is open to additional elements not enumerated. For example, the words "includes" should be interpreted to mean "including at least" and so on. In addition, articles such as "a" or "the" should be interpreted as not referring to a specific number, such as one, unless explicitly indicated. At times a convention of "at least one of A, B, or C" is used, the intent is that this language includes any of A alone, B alone, C alone, A and B, B and C, A and C, or all of A, B, and C. The same is indicated by the conventions "one of more of A, B, or C." Similarly, the phrase "A, B, and/or C" is intended to include any of A alone, B alone, C alone, A and B, B and C, A and C, or all of A, B, and C. With parentheticals such as (e.g. A, B, C). It is intended that this refer to any or all of A alone, B alone, or C alone and to any combination thereof that is applicable in the particular context.

And as previously indicated elements, components, or operations should not be regarded as essential unless they are so explicitly described. The teaches contained herein may be adapted to a variety of embodiments arranged and composed in a wide variety of ways.

The above description of various embodiments is intended to be illustrative not exhaustive and is not intended to limit this disclosure, its application, or uses. Those skilled in the art will be able to imagine embodiments not described but that are consistent with the principles and teachings described herein. Therefore, the above description of exemplary embodiments is not intended to limit the scope of this disclosure, which should be defined only in accordance with the following claims and equivalents thereof.

I claim:

1. A rodent kill trap comprising:
   a handle;
   at least a first leg and a second leg that are at least one of fixedly attached to or integral with the handle and that are configured to be positioned via the handle, wherein the first leg and the second leg are configured to stand the rodent kill trap in a standing position on a surface via at least one of:
   first and second points for penetrating ground, the ground being the surface; or
   one or more bases for supporting the first and second legs on the surface;
   at least a first crossmember and a second crossmember that is parallel to the first crossmember, the first crossmember and the second crossmember being coupled with and extending between the first leg and the second leg, the first crossmember being closer to the handle than the second crossmember;
   a trigger rotatably coupled with the first crossmember, the trigger including at least a length of the trigger extending away from the first crossmember, wherein the length of the trigger is configured to hang freely from the first crossmember with a distal end of the length of the trigger positioned above the surface when the rodent kill trap is in the standing position;
   a hammer rotatably coupled with the second crossmember and in engaging contact with a bias mechanism that resists rotation of the hammer about the second crossmember; and
   a sear as part of the trigger configured for being braced against the hammer in a cocked position in which the hammer is rotated about the second crossmember in opposition to the bias mechanism and wherein if the length of the trigger is engaged by a rodent the sear is configured to be dislodged from the hammer thereby releasing the hammer to rotate in an arc to strike the rodent.

2. The rodent kill trap of claim 1, wherein the handle has a diameter that is at least twice a diameter of at least the first leg, and wherein the handle is at least indirectly coupled with the hammer and is thereby configured via the indirect coupling to receive a momentum of the hammer when the hammer swings about the second crossmember.

3. The rodent kill trap of claim 2, wherein the handle is indirectly coupled with the hammer via the hammer being directly attached to the first leg and to the second leg, the first leg and the second leg being directly attached to a second crossmember, and the hammer being rotatably coupled with the second crossmember.

4. The rodent kill trap of claim 1, wherein the handle and the first leg and the second leg are each formed with a single metal bar formed into a U shape.

5. The rodent kill trap of claim 1, wherein the handle includes at least a first metal bar and the first leg and the second leg include at least, respectively, a second bar and a third metal bar, the first bar being attached to ends of the second bar and the third bar via at least one of welding, bolting, or press fitting.

6. The rodent kill trap of claim 1, wherein the handle is composed at least partly of steel, and
   wherein the handle is at least one of fixedly coupled with or integral with an end of the first leg and an end of the second leg.

7. The rodent kill trap of claim 1, wherein the handle is at least one of fixedly attached to or integral with an end of the first leg and an end of the second leg.

8. The rodent kill trap of claim 1, wherein:
   at least one of:
   the first leg and the second leg are composed at least partly of steel; or
   the first crossmember and the second crossmember are each composed at least partly of music wire.

9. The rodent kill trap of claim 1, wherein the bias mechanism is at least one of a single torsion spring or a double torsion spring.

10. The rodent kill trap of claim 1, wherein the trigger rotatably coupled with the first crossmember, the trigger including at least a length of the trigger extending away from the first crossmember comprises:

the trigger rotatably coupled with the first crossmember by being at least one of affixed or integral with an end of a trigger coil that is at least partially wrapped about the first crossmember, the trigger including the sear and the length of the trigger being a trigger-wire extending away from the first crossmember.

11. The rodent kill trap of claim 10, wherein the sear is composed at least partly of a metal that is at least resistant to at least one of rust or corrosion.

12. The rodent kill trap of claim 10, wherein the trigger-wire is composed at least partly of music wire.

13. The rodent kill trap of claim 10, wherein the trigger-wire is configured, when the sear is braced against the hammer in a cocked position, to extend from the sear to a position between the first and the second legs.

14. The rodent kill trap of claim 1, wherein the hammer rotatably coupled with the second crossmember and in engaging contact with the bias mechanism that resists rotation of the hammer about the second crossmember comprises:

the hammer rotatably coupled with the second crossmember and in engaging contact with at least one of a single torsion spring or a double torsion spring that resists rotation of the hammer about the second crossmember, the hammer including at least a hammer base that is rotatably affixed to the second crossmember, a hammer shaft, a cocking lever configured for gripping by a user, and a hammer head for engaging the sear and for striking the rodent.

15. The rodent kill trap of claim 14, wherein the hammer base is centered about the second crossmember spaced equally from the first leg and the second leg and wherein the hammer base includes a first hole for receiving the hammer shaft and a second hole through which the second crossmember extends.

16. The rodent kill trap of claim 14, wherein the hammer is formed at least partly of steel.

17. The rodent kill trap of claim 1, wherein:

the hammer is a single hammer;

a diameter of the handle is at least twice a diameter of either the first leg or the second leg; and the handle is at least indirectly coupled with the hammer at least in part via the first leg and the second leg and the handle is thereby configured to receive and dampen a momentum of the hammer relative to the first and the second leg when the hammer is released from contact with the sear to rotate in the arc.

18. The rodent kill trap of claim 1, wherein the sear as part of the trigger configured for being braced against the hammer in the cocked position in which the hammer is rotated about the second crossmember in opposition to the bias mechanism and wherein if the length of the trigger is engaged by the rodent the sear is configured to be dislodged from the hammer thereby releasing the hammer to rotate in the arc to strike the rodent comprises:

wherein when the first leg and the second leg are in the standing position, the sear is configured to be dislodged from the hammer thereby (1) releasing the hammer to rotate in the arc toward the surface to strike the rodent and (2) causing the length of the trigger to rotate upward in another arc away from the surface.

19. A rodent kill trap comprising:

a handle;

at least a first leg and a second leg with at least a first point and a second point, with the at least the first leg and the second leg being at least one of fixedly attached to or integral with the handle, the first leg and the second leg being configured to be driven into ground via the handle, the first point and the second point to stand the rodent kill trap in a standing position;

at least a first crossmember and a second crossmember, the second crossmember being parallel to the first crossmember, and the first crossmember and the second crossmember being coupled with and extending between the first leg and the second leg, the first crossmember being closer to the handle than the second crossmember;

a trigger rotatably coupled with the first crossmember, the trigger including at least a sear, and the trigger further including at least a trigger-wire at least one of coupled with or integral with the sear and that is extending away from the first crossmember, wherein the trigger-wire is configured to hang freely from the first crossmember with a distal end of the trigger-wire positioned above the ground when the rodent kill trap is in the standing position; and a hammer rotatably coupled with the second crossmember and in engaging contact with at least one or more torsion springs that resist rotation of the hammer about the second crossmember; and wherein the sear is configured for being braced against the hammer in a cocked position in which the hammer is rotated about the second crossmember in opposition to the one or more torsion springs and wherein if the trigger-wire is engaged by a rodent the sear is configured to be dislodged from the hammer thereby releasing the hammer to rotate in an arc to strike the rodent.

20. A rodent kill trap comprising:

a handle;

one or more bases configured with a one or more flat sides for resting on a flat surface;

at least a first leg and a second leg having, respectively, at least a first end and a second end, the first end and the second end being at least one of coupled with or integral with the one or more bases, the first leg and the second leg being at least one of coupled with or integral with the handle, and the trap being configured to be gripped by the handle to place the one or more flat sides of the one or more bases on the flat surface with the rodent kill trap in a standing position on the flat surface;

at least a first crossmember and a second crossmember, the second crossmember being parallel to the first crossmember, the first crossmember and the second crossmember being coupled with and extending between the first leg and the second leg, the first crossmember being closer to the handle than the second crossmember;

a trigger rotatably coupled with the first crossmember, the trigger including at least a sear, and the trigger further including at least a trigger-wire that is at least one of coupled with or integral with the sear and extending away from the first crossmember, wherein the trigger-wire is configured to hang freely from the first crossmember with the distal end of the trigger-wire positioned above the flat surface when the rodent kill trap is in the standing position; and a hammer rotatably coupled with the second crossmember and in engaging contact with at least one or more torsion springs that resist rotation of the hammer about the second crossmember; and wherein the sear is configured for being braced against the hammer in a cocked position in which the hammer is rotated about the second crossmember in opposition to the one or more torsion springs and wherein if the trigger-wire is engaged by a rodent the sear is configured to be dislodged from the hammer thereby releasing the hammer to rotate in an arc to strike the rodent.

* * * * *